Dec. 24, 1968  K. PAULE ET AL  3,418,504
PORTABLE ELECTRIC MOTOR DRIVEN POWER TOOL
WITH SEPARABLE PLASTIC HOUSING
Filed June 13, 1966  2 Sheets-Sheet 2
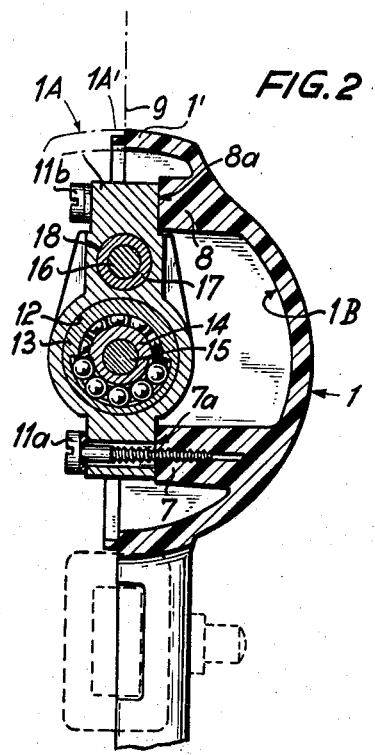
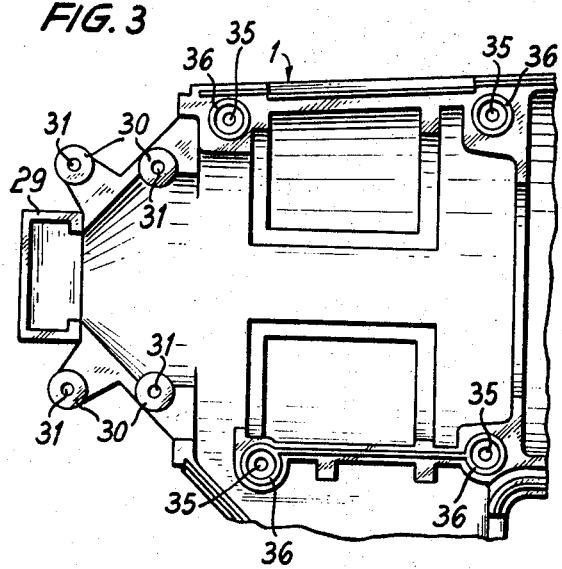
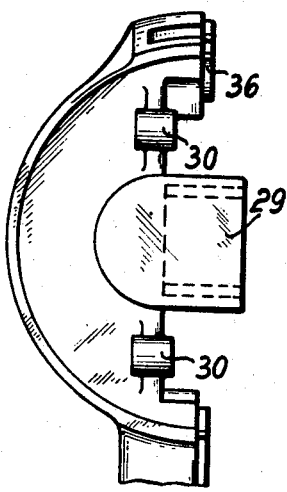
INVENTORS
Kurt Paule
Gerhard Armbruster
Manfred Kirn
by Michael J. Striker
Atty United States Patent Office 3,418,504
Patented Dec. 24, 1968

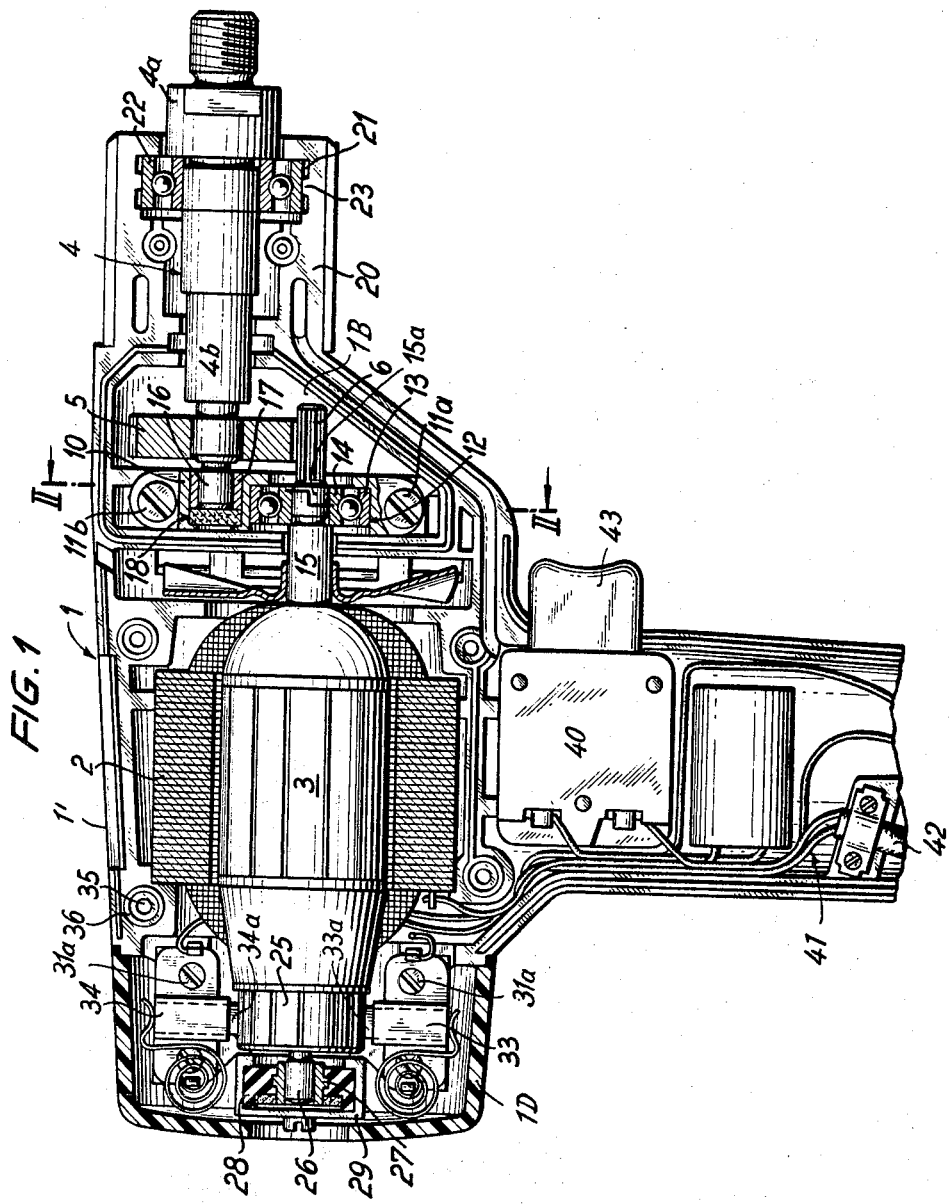

3,418,504
PORTABLE ELECTRIC MOTOR DRIVEN POWER TOOL WITH SEPARABLE PLASTIC HOUSING
Kurt Paule, Stuttgart-Oberturkheim, Gerhard Armbruster, Stuttgart-Plieningen, and Manfred Kirn, Stuttgart-Mohringen, Germany, assignors to Robert Bosch G.m.b.H., Stuttgart, Germany
Filed June 13, 1966, Ser. No. 557,144
Claims priority, application Germany, Aug. 20, 1965, B 83,436
10 Claims. (Cl. 310—50)

The present invention relates to electric power tools in general, especially to portable electric drills and similar power tools with a motor-driven tool spindle. More particularly, the invention relates to improvements in the construction, mounting and distribution of rotary components in an electric power tool and to improvements in the bearings for such rotary components.

It is already known to assemble the housing of a portable electric power tool of two shells whose marginal portions abut against each other and each of which takes up some of the stresses which arise when the motor rotates the tool spindle. As a rule, the two shells are integral with suitable bearing portions which directly support the output shaft of the electric motor and the tool spindle or the bearings for such rotary parts. In many instances, the means for transmitting motion from the output shaft to the tool spindle comprises a set of intermeshing gears which must transmit considerable torque and tend to move the two shells apart. In addition, such stressing of the shells results in rapid destruction of their bearing portions. Furthermore, the motors of such tools cannot be tested when the interior of the housing is exposed.

Accordingly, it is an important object of the present invention to provide an improved electric power tool, particularly a portable electric power drill or the like, whose shells are not subjected to appreciable separating stresses when the tool is in actual use.

Another object of the invention is to provide an electric power tool whose motor may be tested upon separation of shells which provide a housing for the motor when the tool is in actual use.

A further object of the invention is to provide the improved electric power tool with a novel system of bearings which prevent transmission of excessive stresses to the housing and which allow for at least some adjustments in the position of the motor shaft and/or tool spindle.

An additional object of the instant invention is to provide a power tool wherein all such parts which require periodic inspection or maintenance are fully exposed and readily accessible in response to separation of one shell from the other shell.

A concomitant object of the invention is to provide a novel bearing member for use in an electric power tool of the above outlined characteristics.

A further object of the invention is to provide a novel housing for the improved power tool.

Still another object of the invention is to provide an electric power tool whose life expectancy exceeds considerably the life expectancy of similar power tools of conventional design.

Another object of the invention is to provide an electric power tool which produces little noise and which can be readily manipulated by persons having little technical skill.

Briefly stated, one feature of our invention resides in the provision of an electric power tool, for example, a portable electric drill with pistol grip, which comprises a housing including two similar shells together defining a chamber and having abutting marginal portions, a metallic bearing member provided in the chamber and having two parallel bores, fastener means securing the bearing member to one of the shells, a tool spindle having a rear portion extending into one of the bores in the bearing member, an electric motor including an output shaft extending through the other bore of the bearing member so that its front portion is adjacent to an intermediate portion of the spindle, and a transmission preferably including a gear train providing a motion transmitting connection between the front portion of the output shaft and the spindle. When the two shells are separated from each other, the one shell accommodates all such components which are necessary to operate the motor and to rotate the spindle so that the motor may be tested while the other shell is removed.

The shells of the housing preferably consist of synthetic plastic material and the power tool further comprises an antifriction bearing which is accommodated in a barrel-shaped portion of the housing and rotatably receives the front portion of the spindle. The aforementioned transmission preferably comprises a spur gear which is coaxial with the spindle and is immediately adjacent to the front end of the bearing member.

The novel features which are considered as characteristic of the invention are set forth in particular in the appended claims. The improved electric power tool itself, however, both as to its construction and the mode of assembling the same, together with additional features and advantages thereof, will be best understood upon perusal of the following detailed description of a specific embodiment with reference to the accompanying drawings, in which:

FIG. 1 is a side elevational view of a portable electric power tool with the other shell of the housing removed and with certain parts shown in section;

FIG. 2 is a section as seen in the direction of arrows from the line II—II of FIG. 1;

FIG. 3 is an inside view of the rear portion of the one shell, with the motor and other detachable components removed; and FIG. 4 is an end elevational view of the one shell as seen from the left-hand side of FIG. 3.

Referring first to FIGS. 1 and 2, there is shown a portable electric power tool which comprises a housing including two similar shells 1, 1A. These shells define between themselves a chamber 1B and preferably consist of suitable synthetic plastic material. The marginal portions 1', 1A' of the shells 1, 1A abut against each other along a plane 9 (indicated in FIG. 2 by a dash-dot line), and the two shells are at least nearly mirror symmetrical with reference to the plane 9.

The rear portion of the chamber 1B accommodates the field coils 2 of a stator forming part of an electric motor and surrounding the armature 3 of a rotor. The front portions of the shells 1, 1A (only the front portion 20 of the shell 1 is shown in FIG. 1) together form a barrel which accommodates the major part of a tool spindle 4. The front portion 4a of the spindle 4 extends beyond the barrel and is configurated in such a way that it can be readily coupled with a drill, screwdriver or another suitable rotary tool. In accordance with an important feature of our invention, the shell 1A is readily separable from the shell 1 and the latter supports not only the electric motor but also the tool spindle 4 and all other components of the motor circuit so that the motor may be tested while the shell 1A remains detached from the shell 1.

The electric motor further comprises an output shaft 15 which forms part of the rotor and is operatively connected with the rear portion 16 of the tool spindle 4 by a transmission which preferably comprises a two-piece gear train including a pinion 6 secured to or integral with the front portion 15a of the output shaft 15 and a spur gear 5 which meshes with the pinion 6 and is rigid with an intermediate portion 4b of the tool spindle. The pressures which arise when the gear train 5, 6 rotates the tool spindle 4 are taken up by a metallic bearing member 10 which is detachably affixed to the shell 1 by fastener means including two sockets 7, 8 and two self-threading screws 11a, 11b. The function of the bearing member 10 is to support the rear portion 16 of the tool spindle 4 and the front portion 15a of the output shaft 15. As best shown in FIG. 2, the bearing member 10 is formed with two parallel bores 12, 18 whose axes are located in a plane parallel to or coinciding with the symmetry plane 9. The sockets 7, 8 are integral with the shell 1 and have exposed faces 7a, 8a which abut against flat portions of the bearing member 10. As stated above, the screws 11a, 11b are of the self-threading type, i.e., they will cut threads into the material of the sockets 7, 8 when driven home by means of a suitable tool. The planes of the exposed faces 7a, 8a are parallel to the symmetry plane 9.

The diameter of the bore 12 in the bearing member 10 is greater than that of the bore 18. The bore 12 accommodates the outer race 13 of an antifriction bearing whose inner race 14 is press-fitted onto the front portion 15a of the output shaft 15. As shown in FIG. 1, the front portion 15a extends forwardly through and beyond the bore 12 and is integral with the pinion 6.

The rear portion 16 of the tool spindle 4 is of reduced diameter and is received in an antifriction bearing including a bearing sleeve 17 consisting of sintered material. This bearing is of the self-lubricating type and the sleeve 17 directly surrounds the rear portion 16. The means for supplying lubricant to the sleeve 17 may comprise a felt ring which is impregnated with oil. The sleeve 17 is fitted into the smaller-diameter bore 18 of the bearing member 10.

The barrel of the housing which includes the shells 1 and 1A accommodates an antifriction bearing 22 for the front portion 4a of the tool spindle 4. As shown in FIG. 1, the front portion 20 of the shell 1 (this front portion forms one-half of the barrel) is provided with a semicircular internal recess 21 which can accommodate the outer race of the bearing 22. This recess 21 is preferably provided close to the foremost end of the barrel, i.e., at a reasonable distance from the front face of the bearing member 10. As shown in FIG. 1, the recess 21 comprises two axially spaced deeper zones separated by a semicircular rib 23 which abuts against the outer race of the bearing 22. The internal surface of the rib 23 is precision finished by means of a suitable milling or other tool after the material of the shell 1 sets, i.e., after the material of the shell 1 is allowed to cool subsequent to removal from the mold. If the material of the freshly molded shell 1 is subjected to further aging or stabilizing treatment, the internal surface of the rib 23 is finished after all such secondary treatments are completed to make sure that the outer race of the bearing 22 will have a highly accurate fit. In other words, the seat for the bearing 22 will be precision finished subsequent to completed deformation of the material of which the shell 1 consists. The other shell 1A is treated in similar fashion. By precision finishing the internal surface of the rib 23, the person assembling the power tool makes sure that such precision treatment compensates for eventual deformation of the front portion 20 during hardening, aging and other treatment of the shell 1.

The rear end of the housing including the shells 1 and 1A carries a detachable plastic cap 1D which can be removed to expose a stub shaft 26 of the rotor. The cap 1D normally conceals the commutator 25 and the brushes 33a, 34a of the electric motor, the commutator 25 being located directly in front of the stub shaft 26. The stub shaft is supported by a bearing unit 27–29 which is carried by the shell 1 and whose purpose is to prevent jamming of the rotor during assembly of the power tool or during testing when the shell 1A is detached. The numeral 29 denotes a box-shaped receptacle or frame 29 which is shown as being integral with the rear portion of the shell 1 and defines a compartment for an elastic cushion 28 of oil-resistant rubber or the like. The cushion 28 reduces noise and surrounds a bearing sleeve 27 of sintered metal which accommodates the stub shaft 26. The configuration of the receptacle 29 is best shown in FIGS. 3 and 4. The elastic cushion 28 compensates for minor changes in the inclination of the rotor in response to adjustments in the position of the bearing member 10 with reference to the sockets 7 and 8. For example, the cushion 28 will compensate for minor adjustments of the bearing member 10 in the symmetry plane 9 and at right angles to the axis of the output shaft 15. The cushion will also compensate for minor adjustments which involve turning the bearing member 10 about the screw 11a or 11b.

The rear portion of the shell 1 is provided with four eyes 30 which are disposed in pairs at levels above and below the receptacle 29. The eyes 30 are formed with bores 31 which can receive the stems of self-threading screws 31a serving to connect the shell 1 with two brush holders 33, 34. The two brush holders are separable from the shell 1.

The shell 1 is further provided with a plurality of bores 35 which can receive self-threading screws (not shown) serving to provide a separable connection between the shells 1 and 1A. The shell 1A is formed with recesses each of which can accommodate one of the annular ribs 36 which surround the bores 35 of the shell 1.

The lower portion of the shell 1 constitutes one-half of a pistol grip and accommodates a normally open switch 40 and a set of conductors 41 which can connect the electric motor in circuit with an outside source of electrical energy. The connection between the source and the motor comprises a cable 42. When the trigger 43 of the switch 40 is depressed, the motor circuit is completed and the operator can test the motor while the shell 1A remains detached from the shell 1. This is due to the fact that the entire motor circuit, the entire transmission, the tool spindle and all necessary bearings are carried by the shell 1 alone.

The bearing member 10 takes up all such stresses which arise when the spindle 4 meets considerable resistance to rotation while the operator presses upon the trigger 43 to complete the circuit of the motor. The bearing member 10 prevents transmission of such stresses to the shells 1 and 1A because it supports not only the spindle 4 but also the output shaft 15 of the motor. It was found that such construction contributes considerably to the life expectancy of electric power tools. Furthermore, the operator can gain access to the interior of the power tool and can test the motor upon detachment of the shell 1A.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In an electric power tool, a housing comprising two similar shells together defining a chamber and having abutting marginal portions; a metallic bearing member provided in said chamber and having two parallel bores; fastener means securing said bearing member to one of said shells; a tool spindle having a rear portion extending into one of said bores, an intermediate portion and a front portion; an electric motor including an output shaft extending through the other of said bores and having a front portion adjacent to the intermediate portion of said spindle; and a transmisson including a gear train providing a motion transmitting connection between the front portion of said output shaft and the intermediate portion of said spindle, the other shell being separable from said one shell to afford access to said motor, to said transmission and to said spindle.

2. A structure as set forth in claim 1, wherein the marginal portions of said shells abut against each other in a symmetry plane and wherein said shells are substantially mirror symmetrical with reference to such plane.

3. A structure as set forth in claim 1, further comprising an antifriction bearing provided between said shells and receiving the front portion of said tool spindle, said transmission comprising a spur gear provided on the intermediate portion of said spindle in immediate proximity of said bearing member.

4. A structure as set forth in claim 3, wherein said shells consist of synthetic plastic material and comprise front portions together forming a barrel which receives said antifriction bearing, the front portion of said tool spindle extending from said barrel.

5. A structure as set forth in claim 3, wherein said fastener means comprises a pair of sockets integral with said one shell and having faces parallel with said plane, said bearing member having portions abutting against said faces.

6. A structure as set forth in claim 1, wherein said motor comprises a stub shaft coaxial with said output shaft and remote from said bearing member, and further comprising a bearing unit carried by said one shell and rotatably receiving said stub shaft.

7. A structure as set forth in claim 6, wherein said bearing unit comprises a bearing sleeve directly accommodating said stub shaft and an elastic cushion surrounding said sleeve.

8. A structure as set forth in claim 7, wherein said sleeve consists of sintered metal and further comprising a receptacle for said cushion, said receptacle being carried by said one shell.

9. A structure as set forth in claim 1, further comprising a self-lubricating antifriction bearing provided in said one bore and rotatably receiving the rear portion of said spindle.

10. A structure as set forth in claim 1, further comprising conductor means for connecting said motor in circuit with a source of electrical energy and normally open switch means provided in said circuit, said switch means and said conductor means being mounted on said one shell so that said motor can be operated while said other shell is detached from said one shell.

References Cited
UNITED STATES PATENTS

| | | | |
|---|---|---|---|
| 2,636,136 | 4/1953 | Gubbins | 310—50 |
| 2,965,774 | 12/1960 | Rangus | 310—50 |
| 3,121,813 | 2/1964 | Pratt et al. | 310—50 |
| 3,368,090 | 2/1968 | Miller | 310—50 X |

WARREN E. RAY, *Primary Examiner.*

U.S. Cl. X.R.
310—43, 51, 90